(12) United States Patent
Bar-Sever et al.

(10) Patent No.: US 8,120,529 B2
(45) Date of Patent: Feb. 21, 2012

(54) METHOD AND APPARATUS FOR AUTONOMOUS, IN-RECEIVER PREDICTION OF GNSS EPHEMERIDES

(75) Inventors: Yoaz E. Bar-Sever, Altadena, CA (US); William I. Bertiger, Altadena, CA (US)

(73) Assignee: California Institute of Technology, Pasadena, CA (US)

( * ) Notice: Subject to any disclaimer, the term of this patent is extended or adjusted under 35 U.S.C. 154(b) by 636 days.

(21) Appl. No.: 12/208,525

(22) Filed: Sep. 11, 2008

(65) Prior Publication Data

US 2010/0060518 A1    Mar. 11, 2010

(51) Int. Cl.
*G01S 19/27*    (2010.01)
(52) U.S. Cl. .................................. 342/357.66
(58) Field of Classification Search .............. 342/357.66
See application file for complete search history.

(56) References Cited

U.S. PATENT DOCUMENTS

| | | | |
|---|---|---|---|
| 4,963,889 A * | 10/1990 | Hatch | 342/357.27 |
| 5,430,657 A | 7/1995 | Kyrtsos | 364/459 |
| 5,798,732 A | 8/1998 | Eshenbach | 342/357 |
| 5,828,336 A | 10/1998 | Yunck | |
| 5,963,167 A | 10/1999 | Lichten | |
| 6,275,185 B1 | 8/2001 | Loomis | 342/357.14 |
| 6,295,021 B1 | 9/2001 | Lichten | |
| 6,542,820 B2 | 4/2003 | LaMance et al. | 701/213 |
| 6,608,589 B1 | 8/2003 | Devereux et al. | 342/357.06 |
| 7,324,045 B2 | 1/2008 | Mo et al. | 342/357.15 |
| 7,403,154 B2 | 7/2008 | Garin | |
| 7,436,357 B2 | 10/2008 | Wang et al. | 342/357.13 |
| 7,446,700 B2 | 11/2008 | Yu et al. | 342/357.02 |
| 7,564,406 B2 | 7/2009 | Han | 342/357.12 |
| 7,693,660 B2 | 4/2010 | van Diggelen et al. | 701/226 |
| 2003/0112181 A1 | 6/2003 | Kalafut et al. | 342/385 |
| 2005/0250558 A1 | 11/2005 | Hutchinson | 455/574 |
| 2008/0018527 A1 | 1/2008 | LaMance et al. | 342/357.1 |

(Continued)

FOREIGN PATENT DOCUMENTS

EP    1965219 A1    9/2008

(Continued)

OTHER PUBLICATIONS latent. (2007). In the American Heritage® Dictionary of the English Language. Retrieved from http://www.credoreference.com/entry/hmdictenglang/latent.*

(Continued)

*Primary Examiner* — Thomas Tarcza
*Assistant Examiner* — Fred H Mull
(74) *Attorney, Agent, or Firm* — Steinfl & Bruno, LLP

(57) ABSTRACT

Methods and apparatus for autonomous in-receiver prediction of orbit and clock states of Global Navigation Satellite Systems (GNSS) are described. Only the GNSS broadcast message is used, without need for periodic externally-communicated information. Earth orientation information is extracted from the GNSS broadcast ephemeris. With the accurate estimation of the Earth orientation parameters it is possible to propagate the best-fit GNSS orbits forward in time in an inertial reference frame. Using the estimated Earth orientation parameters, the predicted orbits are then transformed into Earth-Centered-Earth-Fixed (ECEF) coordinates to be used to assist the GNSS receiver in the acquisition of the signals. GNSS satellite clock states are also extracted from the broadcast ephemeris and a parameterized model of clock behavior is fit to that data. The estimated modeled clocks are then propagated forward in time to enable, together with the predicted orbits, quicker GNSS signal acquision.

26 Claims, 4 Drawing Sheets

U.S. PATENT DOCUMENTS

| | | | |
|---|---|---|---|
| 2008/0111738 A1* | 5/2008 | Han | 342/357.12 |
| 2008/0129593 A1* | 6/2008 | Garin et al. | 342/357.15 |
| 2008/0270026 A1 | 10/2008 | Han | 701/213 |
| 2008/0288168 A1 | 11/2008 | Grigorovitch et al. | 701/226 |
| 2009/0085801 A1 | 4/2009 | Sengupta et al. | 342/357.1 |
| 2009/0135061 A1 | 5/2009 | Weng et al. | 342/357.15 |

FOREIGN PATENT DOCUMENTS

| | | |
|---|---|---|
| FR | 2892828 | 5/2007 |
| WO | 2007/092523 | 8/2007 |
| WO | 2008/055223 | 5/2008 |
| WO | 2009/059429 | 5/2009 |

OTHER PUBLICATIONS

Weisstein, Eric W. "Least Squares Fitting." From MathWorld—A Wolfram Web Resource. http://mathworld.wolfram.com/LeastSquaresFitting.html.*

Navstar GPS Space Segment/Navigation User Interface. Navstar Global Positioning System, Interface Specification, IS-GPS-200, Revision D. ARINC Engineering Services, LLC, Dec. 7, 2004.*

Numerical Recipes, Press et al, Cambridge University Press (1989), Chapter 15.1-15.2, pp. 550-560.

Bate et al, Fundamental of Astrodynamics, Dover (1971), Chapter 5.2, pp. 227-231.

New Empirically Derived Solar Radiation Pressure Model for Global Positioning System Satellites During Eclipse Seasons, Y. Bar-Sever and D. Kuang, IPN Progress Report 42-160, (2005).

IERS Conventions (2003), Dennis D. McCarthy and Gérard Petit, Verlag des Bundesamts für Kartographie und Geodäsie (2004).

50 cm (median) Real-time Accuracy for GPS Orbits by way of Prediction, Y. Bar-Sever, J. Zumberge, R. Liu, GPS Performance Analysis Work Group (PAWG) meeting, Colorado Springs (1996).

International Search Report for PCT/US2009/054635 filed on Aug. 21, 2009 in the name of California Institute of Technology.

Written Opinion for PCT/US2009/054635 filed on Aug. 21, 2009 in the name of California Institute of Technology.

Arai, N., et al., Production and Evaluation of Predicted GPS Satellite Orbit Information for Navigators, IEICE Transactions on Communications (Japanese Edition) 2001, J84-B: 2132-2139 (English Translation—Abstract Only).

Extended EP Search Report for EP 09822368 mailed on Nov. 18, 2011.

* cited by examiner

METHOD AND APPARATUS FOR AUTONOMOUS, IN-RECEIVER PREDICTION OF GNSS EPHEMERIDES

STATEMENT OF GOVERNMENT GRANT

The invention described herein was made in the performance of work under a NASA contract, and is subject to the provisions of Public Law 96-517 (35 USC 202) in which the Contractor has elected to retain title.

FIELD

The present disclosure relates to satellite based positioning systems and methods. More particularly, it relates to methods and apparatus for the prediction of satellite ephemerides (comprising orbit and clock states) using the broadcast ephemeris directly obtained from Global Navigation Satellites, without any external data communications.

BACKGROUND

The navigation signals from Global Navigation Satellite Systems (GNSS), such as the Global Positioning System (GPS) and GLONASS, are used by GNSS receivers to provide position, navigations and timing (PNT) services, and many related applications.

As shown in FIG. 1, a GNSS receiver (110) typically comprises a radio frequency (RF) section (102) and a digital section (105). The digital section (105) further comprises a central processing unit (CPU) (107) and a memory (104). Some GNSS receivers share the digital section with a host device, such as a cell phone, or a personal navigation device.

To perform its basic positioning function, which underlies nearly all PNT applications, a GNSS receiver first acquires the GNSS navigation signal (101) from a sufficient number of GNSS satellites (100), and then extracts from the signal (101) the necessary navigation information. The acquisition of the GNSS signal is carried out in the RF section (102), and the extraction of the navigation information is carried out in the digital section (105). The navigation information embedded in the GNSS navigation signal, and required for positioning, comprises i) the range from the receiver to the transmitting satellites (also known as Pseudo Range because it depends on the inaccurate knowledge of the satellite and receiver clocks, which must later be adjusted using information about the GNSS satellite clock states from the broadcast navigation message, and a least squares estimation of the receiver clock state), and ii) the location, velocity, and clock state of the transmitting satellites. Using data i) and ii), the receiver can triangulate its position using a least squares or similar estimation approach.

An important metric of receiver performance is the time to first fix (TTFF). This metric measures how long it takes a receiver to acquire the GNSS signals and estimate its position under a variety of conditions, including cold start, i.e., in the absence of any prior accurate knowledge of its position or time or of the current state of the GNSS satellites. For best user experience it is desirable that TTFF be minimized. A significant portion of TTFF from cold start (or even from 'warm start', where partial relevant a priori information is available) is spent by the receiver's RF section (102) in acquiring the GNSS signals, and an additional time is spent in the digital section (105) in extracting the satellite position and clock state information from the navigation message portion of the GNSS navigation signal.

The time-consuming aspect of the signal acquisition stems from the need to scan the full possible space of range and Doppler values for the desirable signal. The actual speed with which any particular GNSS receiver acquires the GNSS navigation signals strongly depends on its design, its location and its environment.

After the signals have been acquired by the RF section (102), the navigation information has to be extracted in another time-consuming step. For example, the GPS navigation message is encoded as a 50 bits per second binary data stream, and the precise broadcast ephemeris data containing the needed information about the satellite orbit and clock states are spread over a 1500-bit frame (sequence of bits), requiring the receiver (110) to spend up to 30 seconds to extract all the necessary broadcast ephemeris information.

The common approaches to reduce TTFF for GNSS receivers revolve around 'aiding' the receiver with external information. Such information typically takes the form of expected orbit and clock states for the GNSS satellites. With additional a priori information, crude as it may be, of its position and/or clock state, the receiver can narrow the search range and Doppler search space for the GNSS signals and acquire them more quickly. If the aided GNSS orbit and clock states (together called the satellite ephemerides) thus provided to the receiver are sufficiently accurate, they can obviate the need to extract the equivalent information from the navigation signal, further reducing TTFF.

Two basic approaches have been employed for the provision of this type of aid to the receiver (110). The first approach is to provide the receiver (110) in near-real-time with the GNSS orbit and clock states as they are being observed concurrently by a neighboring receiver, or by a network of receivers. This approach requires a continuous, low-latency communications channel, with a fairly high bandwidth, between the monitoring receiver(s), a sequence of servers to collect, process, and disseminate the useful information, and the targeted receiver, which could be, for example, a cell phone or a car navigation device anywhere in the word, or a satellite in low Earth orbit. The second approach being employed is to periodically transfer to the targeted receiver a set of orbit and clock states for the GNSS satellites that are valid over an extended period of time into the future, thus reducing the demands on the required external communications channels. These extended orbit and clock states are calculated by external servers using the broadcast ephemeris and/or range measurements collected over time from a network of GNSS tracking receivers. This latter approach was employed by JPL as early as 1992 in aiding the GPS receiver on the Topex satellite reduce its TTFF. This approach is predicated on the ability to predict, or extend, the GNSS orbit and clock states into the future from past or current information. These ephemerides (comprising the orbit and clock states) are known as 'predicted' or 'extended' ephemerides. In a variant of the latter approach, a server periodically calculates the initial conditions, or 'seeds' of the extended orbit and clock states, and sends only these seeds to the receiver, reducing the needed communications bandwidth. The receiver then generates the extended ephemeris from the seeds using a stored model of the satellite orbit and clock dynamics.

Regardless of the aiding approach, whether with near-real-time ephemeris or related information (such as the full GNSS navigation message), or with extended ephemeris or related information (such as seeds for an extended ephemeris model), they all require a considerable external infrastructure including a network of tracking receivers, servers, and some sort of communications channels between the targeted receiver and the servers of the aiding information. All of these must operate continuously and reliably, and incur significant cost for equipment, real-estate, communications fees, and human monitoring and maintenance.

The trajectory of GNSS satellites, such as GPS and GLONASS, is affected by many physical factors which are not perfectly known, or that are not completely predictable, such as the gravitational attraction of the Earth and the flux of the solar radiation. It is therefore difficult to predict the trajectory of these satellites into the future, and invariably, the accuracy of such predictions degrades with time. It is even harder to predict the state of the atomic clocks on these satellites, as they are subject to both random processes and complex environmental effects (temperature, for example). In addition, the satellites' trajectories and clock states can occasionally be altered by their operators, rendering useless any orbit and clock state prediction. For these reasons, the predicted ephemeris must be updated periodically at fairly regular intervals. These intervals are typically governed by the quality of the satellite clock prediction (which is the quantity hardest to predict), and usually varies from sub-daily to weekly, depending on the receiver's positioning accuracy requirements, and the quality of the orbit and clock prediction algorithms.

There are two basic approaches for predicting the orbit and clock states. The least accurate approach is to obtain a satellite state (orbit and clock) representation at a given time, and propagate it forward with an a priori model. A second, more accurate approach, uses a time series of the satellite or clock states and fits to it a set of model parameters. For the orbit, these model parameters include three initial position coordinates, three initial velocity coordinates, and several physical and empirical parameters of the satellite dynamics, such as solar pressure scale, and constant accelerations. Once these model parameters are estimated, the model can be propagated numerically forward, yielding higher fidelity predicted orbits. A similar process is followed to optimize clock prediction. The time series of orbit and clock states to which the model parameters are fit could be based on accurate data as obtained, for example, from a network-based GNSS orbit determination, or on less accurate data obtained, for example, from the broadcast ephemerides. Regardless, the dominant error source in GNSS orbit and clock predictions is due to uncertainty in the propagation model. The accuracy of the source for the data to fit, whether the broadcast ephemerides or precise ephemerides, is relatively unimportant.

The physical models governing the motion of satellites are best described in a coordinate system that is fixed in inertial space (Earth-centered-inertial—ECI). Consequently, orbit propagation for GNSS satellites is carried out in an ECI coordinate system. However, a terrestrial GNSS receiver requires position information in a coordinate system rotating with the Earth (Earth-centered-Earth-fixed—ECEF), as indeed provided by the GNSS broadcast ephemeris. Therefore, the predicted orbit should be transformed from ECI to ECEF coordinates before it can be used for receiver aiding, and this requires the knowledge of the Earth orientation in inertial space at any given time. However, the Earth orientation follows a highly complex and unpredictable pattern. Earth orientation is observed and reported after elaborate data processing operations using the geodetic techniques of Very Long Baseline Interferometry (VLBI), and GPS. The three key Earth orientation model parameters (EOP), X and Y polar motion, and Length of Day (LOD) are reported periodically by a few agencies, such as NASA-JPL, the International Earth Rotation and Reference Systems Service (IERS), or the National Geo-spatial Agency (NGA), and are used universally to describe the Earth orientation, and enable the transformation between ECI and ECEF coordinate systems. The dependency on these external sources of periodic Earth orientation is currently one of the insurmountable obstacles to accurate, long-term, in-receiver autonomous ephemeris prediction and aiding.

SUMMARY

The present disclosure removes the need for any external infrastructure and operations, with their attendant high cost, by enabling the receiver to autonomously generate the extended orbits and clock states to aid signal acquisition and reduce TTFF.

According to a first aspect, a method to autonomously predict satellite orbit information in Earth-centered-Earth-fixed (ECEF) coordinates for aiding a satellite receiver is provided, comprising: i) obtaining a broadcast orbital ephemeris of the satellite; ii) iteratively estimating orbital position, velocity, and dynamic parameters of the satellite based on a satellite dynamics model, and iteratively estimating Earth orientation parameters (EOP) based on an Earth orientation model, until convergence is obtained; iii) propagating the estimated orbital position, velocity and dynamic parameters forward in time through the satellite dynamics model, thus obtaining predicted orbits; iv) converting the predicted orbits to Earth-centered-Earth-fixed (ECEF) coordinates through the Earth orientation model; and v) storing the converted predicted orbits.

According to a second aspect, a method to autonomously predict satellite clock states is provided, comprising: obtaining broadcast clock records for the satellite; iteratively estimating future clock states of the satellite based on a prediction model, until convergence is obtained; and storing the estimated clock states for autonomous prediction of the satellite clock states.

According to a third aspect, a Global Navigation Satellite System (GNSS) receiver is provided, comprising: a processing unit; and a memory unit, wherein the memory unit is configured to comprise: a first memory section storing software code for satellite orbit prediction and satellite clock states prediction; a second memory section storing recorded satellite broadcast orbit and satellite clock states; a third memory section storing Earth orientation parameter (EOP) values and orbital dynamic parameters; and a fourth memory section storing predicted satellite orbits and satellite clock states calculated in accordance with the software code stored in the first memory section.

Further embodiments are shown in the written specification, drawings and claims of the present application.

Therefore, according to the present disclosure, the need for any communications channels other than the receiver's inherent GNSS RF receiving capability, external infrastructure and operations are removed.

The method according to the present disclosure lends itself to applications on devices such as cell-phone hosted GNSS receivers, personal navigation devices, vehicle navigation devices, and GNSS receivers in Earth orbit.

A first advantage of the present disclosure is that the time to first fix (TTFF) is reduced.

A further advantage of the present disclosure is represented by the frequency and timing of collecting samples of broadcast ephemerides by the receiver, minimizing the required power and memory resources, and maximizing prediction accuracy.

Another advantage of the present disclosure is that orbits for GNSS satellites in an Earth-Centered-Earth-Fixed (ECEF) reference frame are accurately and efficiently predicted many days into the future based on a limited time span of archived records of satellite ECEF orbital states, as can be obtained from the GNSS broadcast ephemeris or from precise orbit determination solutions.

Moreover, the Earth orientation parameters (EOP) of X polar motion, Y polar motion, and length of day (LOD) are accurately and efficiently estimated based solely on a limited time span of archived records of satellite ECEF orbital states.

Additionally, the value of the EOP parameters of X polar motion, Y polar motion, length of day (LOD), and UT1−UTC (UT1 minus UTC, which is the difference between the UTC time scale defined by atomic standards, and the UT1 time scale, defined by the rotation of the Earth) is predicted several years into the future from a historic observed records of these parameters.

Still further, clock states of GNSS satellites can be accurately predicted many days into the future based on a limited time span of archived records of satellite clock states, as can be obtained from the GNSS broadcast ephemeris or from precise clock determination solutions

DETAILED DESCRIPTION

According to the present disclosure, devices and methods are described for autonomously providing signal acquisition aiding to a GNSS receiver with predicted GNSS orbit and clock states, using only inherent receiver resources, and without the need for externally-provided information other than factory-installed information.

Figure 1:
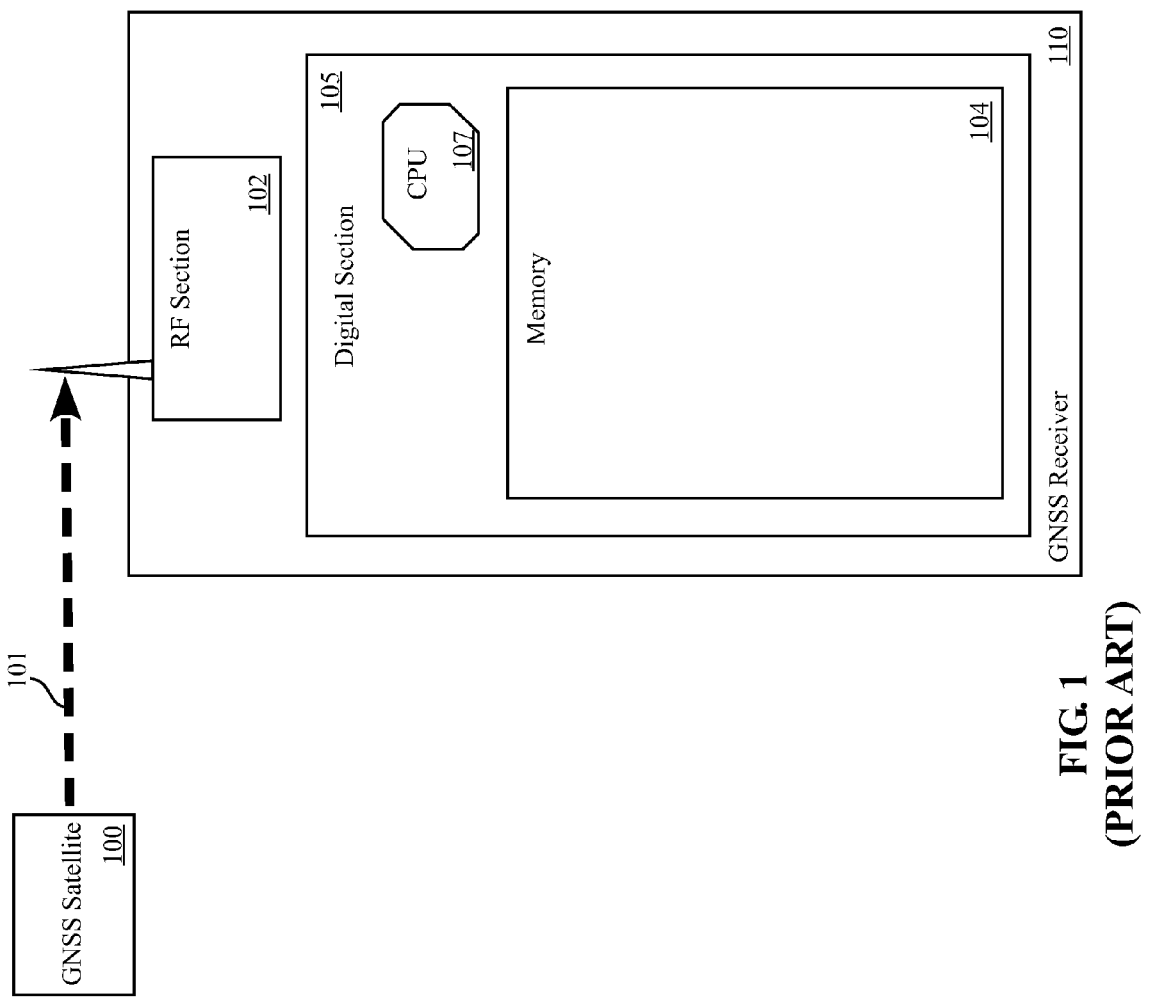
FIG. 1 shows a block diagram of a typical GNSS receiver.
Figure 2:
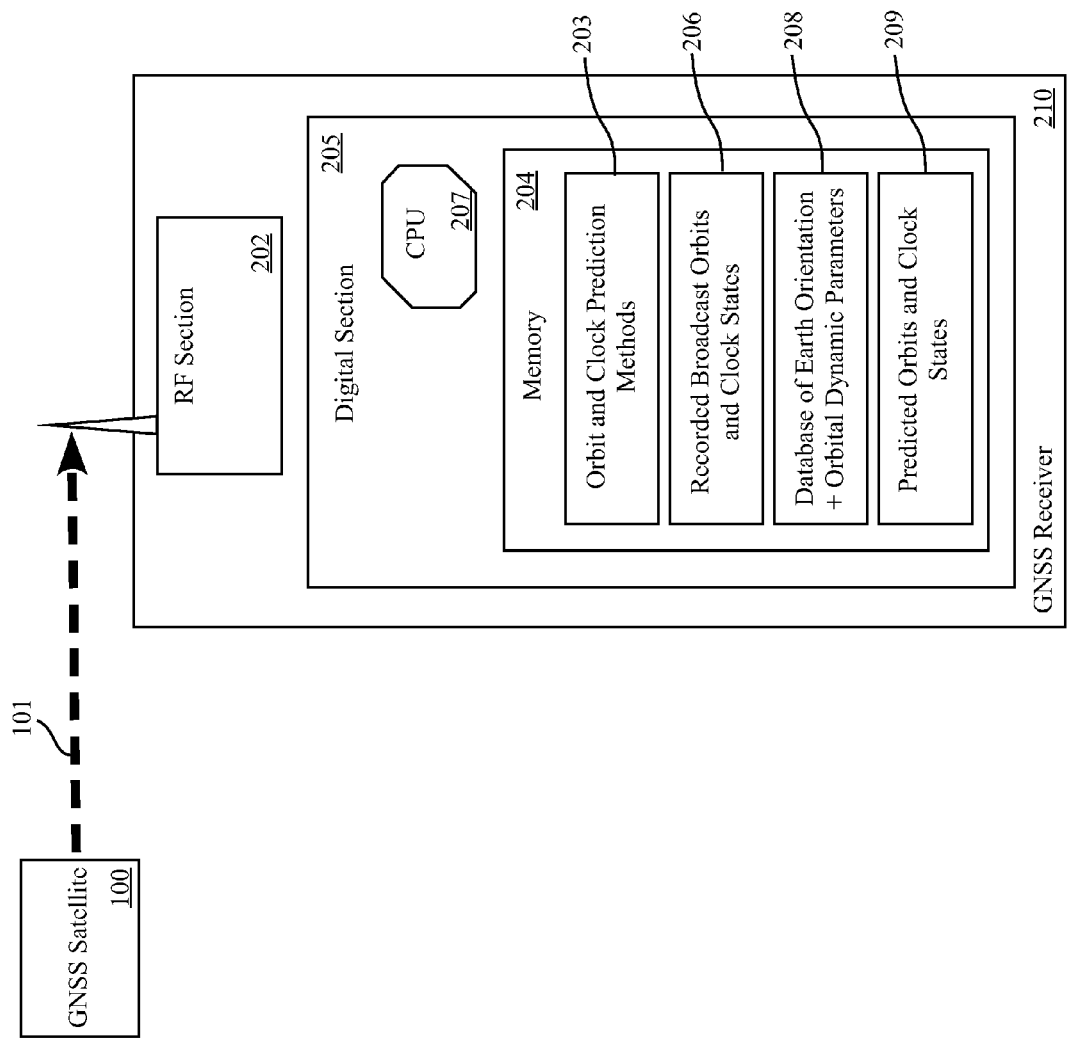
FIG. 2 shows a block diagram of the receiver elements for autonomous predicted orbit and clock aiding according to the present disclosure.

As shown in FIG. 2, the autonomously aided GNSS receiver (210) according to the present disclosure comprises a radio frequency (RF) section (202) in which the GNSS signals are acquired, and a digital section (205) comprising a CPU (207) and a non-volatile memory (204). The digital section (205) may be shared with a host device, such as a personal navigation device (e.g., a cell phone or a car navigation device). The CPU (207) may be implemented in a number of ways without limiting the applicability of the present disclosure. These include, but are not limited to: microprocessors, field programmable gate arrays (FPGAs), or application-specific integrated circuits (ASICs).

The non-volatile memory (204) is configured to comprise the following sections:
1) A section (203) for orbit and clock predictions according to the methods and routines later discussed with reference to FIG. 3 and FIG. 4.
2) A section (206) containing the most recently recorded broadcast ephemerides and clock states.
3) A database (208) of Earth orientation values and orbital dynamic parameters.
4) A section (209) containing the predicted orbit and clock states obtained as a result of applying the methods later described with reference to FIG. 3 and FIG. 4.

Figure 3:
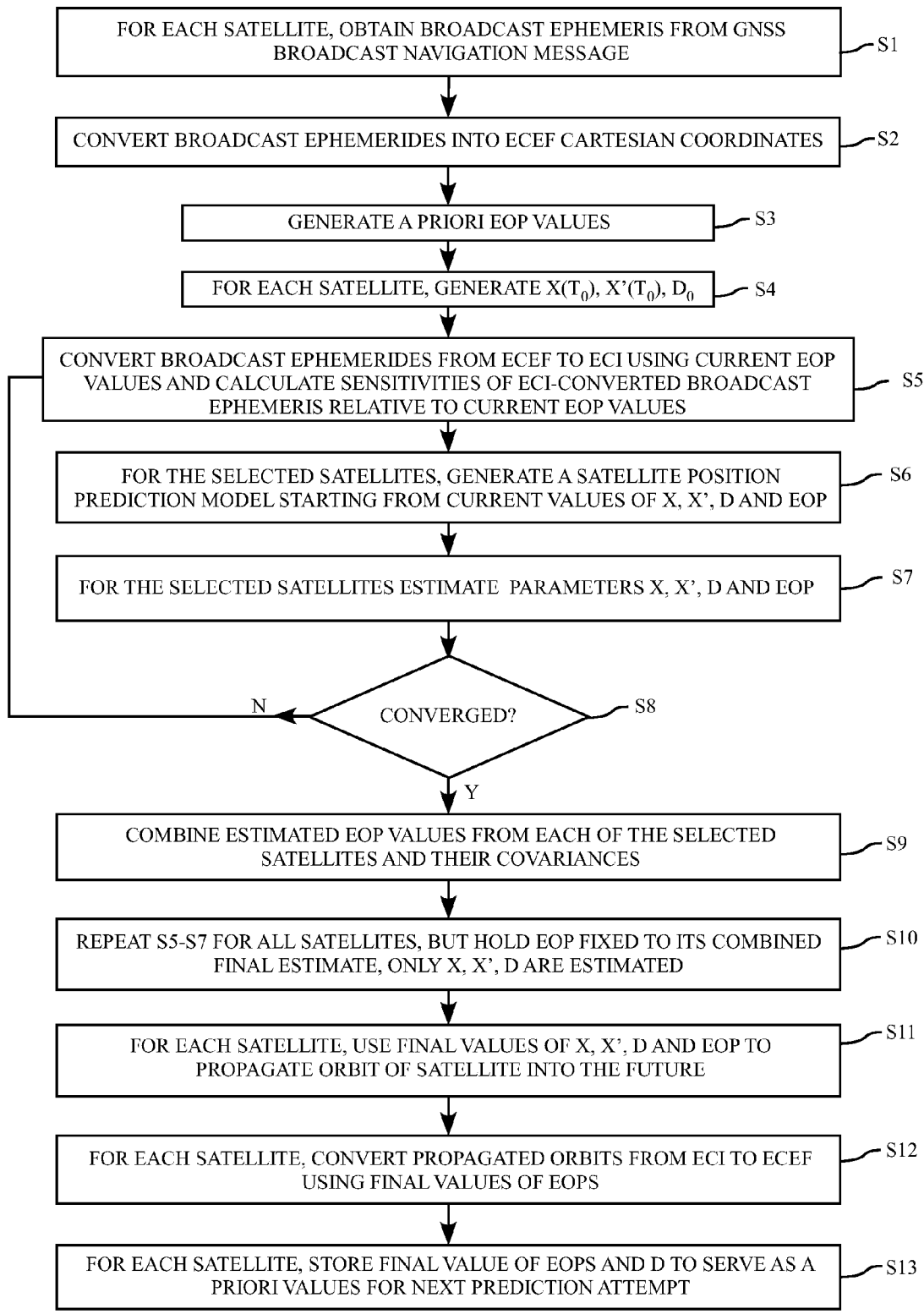
FIG. 3 shows a flow chart of the orbit propagation process according to the present disclosure.

FIG. 3 is a flowchart showing the steps of an embodiment for autonomous prediction of satellite position.

As shown in step (S1), for each satellite, the broadcast ephemeris is obtained from the GNSS broadcast navigation message (101) shown in FIG. 2.

Due to power constraints or other operational limitations, a GNSS receiver may not be able to observe and record broadcast ephemeris data continuously. In order to overcome such problem, a sampling scheme can be devised that is consistent with the operational limitation of a GNSS receiver and enables sufficient quantity and distribution of the broadcast data to facilitate accurate prediction of orbit and clocks.

To maximize the utility of the of the broadcast ephemeris records, taking advantage of their two-hours interval of validity (in case of GPS; for other GNSS systems the interval of validity may be different), and without loss of accuracy, each broadcast ephemeris record can be expanded into 8 individual records, 15 minutes apart.

It should also be noted that at any given time, a terrestrial receiver sees only a fraction of the full GNSS constellation (roughly 30% of the GPS satellites visible from that geographic location at any given time) and that GPS satellites ground tracks tend to repeat every day. In accordance with an embodiment of the present disclosure, the broadcast ephemeris can be sampled at least three times per day, to ensure optimal GPS constellation sampling. Alternatively, a sampling frequency avoiding 24 hour periodicity can be used, until the full constellation is sampled. Such alternative embodiment also overcomes the weakening of the observability of the EOPs which would occur in case of a 24 hour sampling periodicity. According to such embodiment, possible sampling intervals could be a 7-hour interval or a 10-hour interval. A 7-hour interval would sample the whole GPS constellation in approximately one day, with no 24 hour periodicity for 7 days, but with a near 24 hour periodicity after 3 days. A 10-hour interval would sample the whole GPS constellation in approximately 1.5 days, with no 24 hour periodicity for 5 days. Such methods can be implemented through software and be stored into non-volatile memory.

The person skilled in the art will also understand that any additional broadcast records that can be opportunistically obtained due to unplanned receiver operations can be used to enhance the solutions.

All broadcast ephemerides and clock records observed in step (S1) are saved by the receiver (210) in section (206), as shown in FIG. 2. Records older than a certain amount of days (e.g., 14 days) may be discarded.

As shown in step (S2) of FIG. 3, the obtained broadcast ephemerides are then converted from Keplerian coordinates into ECEF (Earth-centered-Earth-fixed) Cartesian coordinates according to methods well known in the art and described in the GPS ICD 200, incorporated herein by reference in its entirety and saved in section (206) of the non-volatile memory.

Step (S3) shows generation of a priori EOP (Earth orientation model parameters) values from historical records, for an epoch in the middle of the time span of the broadcast ephemeris. The EOP values include UT1−UTC, LOD, X polar motion, X polar motion rate, Y polar motion, and Y polar motion rate.

By way of example and not of limitation, a model for predicting the EOP values can be based on a parametric fit to historic time series of measured EOP values, such as those being produced by the International Earth Rotation and Reference Systems Service (IERS). The predictive model for each parameter can be generated by performing a power spectrum analysis of the historic time record (spanning nearly 50 years), and selecting the dominant frequencies, together with a long-term quadratic polynomial. Such predictive model can then be used to effectively extrapolate the historic time series into the future. This model can be implemented as software stored into section (203) of the receiver of FIG. 2.

The predictive EOP values of step (S3) will be later used as a priori values in the least squares estimation scheme of these and other parameters. High accuracy EOP prediction will ensure that the least squares estimation scheme converge to the correct values, and will minimize the data processing time, conserving power. To ensure complete autonomy, the EOP predictive model should be valid for the lifetime of the receiver—typically several years. However, the model can be improved with periodic updates.

The next step (S4) shown in FIG. 3 is that of generating, for each satellite, a) initial orbital position and velocity conditions $x(t_0)$, $x'(t_0)$ and b) initial orbital dynamic parameters $p_d$.

As later shown in the present disclosure, such EOP (S3) orbital conditions (S4) and dynamic parameters (S4) will be iteratively estimated. The following paragraphs will describe a method to perform such iterative estimate, in accordance with an embodiment of the present disclosure. The orbital dynamic parameters $p_d$ are initialized from the database stored in section (208) of the non-volatile memory (204) of the receiver (210).

In particular, such iterative estimate can be performed through a least squares fit to ECEF satellite states. Such estimation method can be a software method stored into section (203) of the receiver (210). For the sake of simplicity, the following description of the estimate refers to a single satellite, which can be identified, for example, by its unique pseudorandom noise number (PRN). Matrix algebra and notations are used. The estimation method is aimed at minimizing the square of the distance between the modeled orbit of the satellite and its broadcast ephemeris, both in ECI coordinates, by adjusting the satellite initial conditions, dynamics parameters, and the three EOPs.

Let $t_j$ be a time point for which a broadcast orbital ephemeris has been obtained for a specific satellite. The index j counts the ephemeris time points, j=1, 2, ... N. Let $r_{ej}$ hold the ECEF position coordinates of the satellite as obtained from the broadcast ephemeris at time $t_j$. Let $r'_{ej}$ hold the ECEF velocity coordinates of the satellite as obtained from the broadcast ephemeris. Let $s_j$ be the assumed error of the broadcast ephemeris position at each time $t_j$. According to an embodiment of the present disclosure, $s_j$=1 meter for all j. Let $s'_j$ be the assumed error of the broadcast ephemeris velocity at each time $t_j$. For example, let $s'_j$=0.001 meter/sec for all j. Let T=T($t_j$,EOP) be a rotation matrix from ECEF to ECI. T is a function of time and of the Earth orientation parameters, EOP. In other words, T represents the Earth orientation at each epoch of the broadcast ephemeris.

An exemplary way of computing T is that of using methods for a) computation of Earth orientation as a function of time and of the EOP (UT1−UTC, LOD, X and Y polar motions, and their rates) and b) computation of the sensitivity of the Earth orientation to the EOP. For example, methods a) and b) can follow the 2003 IERS Conventions for modeling of the Earth precession, nutation, polar motion and Earth rotation (see IERS Conventions (2003). Dennis D. McCarthy and Gérard Petit. Verlag des Bundesamts für Kartographie und Geodäsie, 2004, incorporated herein by reference in its entirety). These methods can be software routines stored into section (203) of the receiver (210).

Therefore, the broadcast orbital ephemerides can be converted from ECEF to ECI using the current EOP values and calculating the partial derivatives (sensitivities) of the ECI-converted broadcast orbital ephemeris relative to the current EOP values, as shown in step (S5) of FIG. 3. The calculated sensitivities are then stored in the receiver (210).

Turning back to the iterative estimate method, let x and x' be 3-dimensional vectors, holding the ECI position and velocity, respectively, of the satellite at the first time point, $t_1$. Initially x can be obtained by $T r_{e1}$, and x' can be obtained by $T r'_{e1} + T' r_{e1}$. In one embodiment of the method according to the present disclosure, the velocities from the broadcast ephemeris are not used, and in that case x' can be obtained by solving the so-called Gauss problem using $T r_{e1}$, $T r_{e2}$, $t_1$, and $t_2$ (see Bate et al, Fundamental of Astrodynamics, Dover, 1971, Chapter 5.2, pages 227-231, incorporated herein by reference). Later, x and x' will be estimated and iterated upon.

Let $p_d$ be a set of m orbital dynamics parameters whose a priori values are not known sufficiently well, but have high impact on the orbital dynamics of the GNSS satellite. According to one of the embodiments of the present disclosure, $p_d$ consists of seven parameters: the scale of the solar pressure model (commonly termed "solar scale"), a constant acceleration in a direction perpendicular to the Sun-Earth-Satellite plane (commonly termed "Y-Bias"), four harmonic coefficients representing twice per orbital period accelerations in the radial and cross-track directions, and a constant in-track acceleration.

Let $p_{eop}$ be a set of n EOP parameters whose a priori values are not known sufficiently well, but have high impact on the rotation from ECEF frame to ECI frame. In one of the embodiments of the present disclosure, $p_{eop}$ is provided with three parameters: LOD, X polar motion, and Y polar motion.

Let $r_i = r_i (x,x',p_d)$ be the modeled ECI position coordinates of the satellite at time $t_j$. $r_i$ is a function of the initial conditions, x, and x', and of the dynamic parameters, $p_d$, and is obtained through integration of the equation of motion from time $t_1$ to time $t_j$. $r_i$ depends only weakly on $p_{eop}$, and therefore this dependency is not specified explicitly. Similarly, let $r'_i = r'_i (x,x',p_d)$ be the modeled ECI velocity coordinates of the satellite at time $t_j$. When the velocity coordinates are not extracted from the broadcast ephemeris, they will also not be modeled.

Therefore, a satellite position prediction model is generated starting from the current values of x, x', $p_d$ and $p_{eop}$, as shown in step (S6) of FIG. 3. Once this is done, the parameters x, x', $p_d$ and $p_{eop}$ are estimated based on such prediction model and the broadcast ephemeris expressed in ECI coordinates, as shown in step (S7) of FIG. 3.

The above mentioned equation of motion/prediction model can be obtained, for example, through a GNSS orbit model that a) enables the propagation of the satellite trajectory from a set of initial conditions (position and velocity at a given time) and specific model parameters (such as the Earth gravitational constant, satellite mass, etc.) and b) computes the sensitivities of the propagated state to such initial conditions and model parameters. Stated differently, a GNSS orbit model can be provided, which integrates the equation of motion and variational equations with sufficient fidelity. The fidelity of the model will directly impact the accuracy of the resulting predicted orbits. According to one of the embodiments of the disclosure, the GNSS orbit model adopts a 4-5 order, variable step size Runge-Kutta-Fehlberg ordinary differential equation integrator (see, for example, Numerical Recipes, Press et al, Cambridge University Press, 1989, Chapter 15.1-15.2, pages 550-560, incorporated herein by reference), and the following models of orbital dynamics: point mass attraction for Earth, Sun, and Moon using the JPL Planetary Ephemeris for the relative position of the Earth, Sun, and Moon; Earth gravity field up to degree and order 12; solar pressure model, such as the empirical model of Bar- Sever and Kuang [IPN Progress Report 42-160, JPL, 2004, http://ipnpr.jpl.nasa.gov/progress_report/42-160/title.htm, incorporated herein by reference in its entirety], which was shown to improve orbit prediction of GPS satellites; a conical Earth and Moon shadow model, such as the model shown in U.S. Pat. Nos. 5,963,167, and 5,828,336, both of which are incorporated herein by reference in their entirety; a satellite attitude model such as the model shown in U.S. Pat. No. 6,295,021 for GPS satellites, which patent is also incorporated herein by reference in its entirety; RF thrust model; and relativity models. The GNSS orbit model can be implemented as a software routine stored into section (203) of the receiver (210).

Turning back to the iterative estimate, for notation purposes, let d be the composite (6+m)-dimensional vector comprising of x, x', and $p_d$. That is: $d^t=[x^t; x'^t; p_d]$, where superscript $^t$ indicates the transpose operation. Let $\nabla_d$ be the dynamics gradient operator, defined as follows:

$$\nabla_d[k]=\partial/\partial d[k], k=1,\ldots,6+m$$

$E_d r_i$, then, is the 3×(6+m) matrix of the sensitivities of $r_i$ with respect to x, x', and $p_d$, and is computed by integrating the variational equations of motion (see the model explained above) from time $t_1$ to time $t_j$. If necessary, $\nabla_d r'_i$ is similarly defined and computed by integrating the variational equations of motion. Let $\nabla_{eop}$ be the EOP gradient operator, defined as follows:

$$\nabla_{eop}[k]=\partial/\partial p_{eop}[k], k=1,\ldots n$$

where $\nabla_{eop} T$ can be computed by the above described method of obtaining T.

The least squares problem can now be formulated as follows: find the set of parameters d, and $p_{eop}$, that minimizes, in least square sense, the distance between the observed position in ECI frame, T $r_{ej}$, and the modeled position in ECI frame, $r_j$, for j=1, . . . N. To solve this problem numerically, the problem is linearized around the a priori values of the solved-for parameters d and $p_{eop}$, and the resulting linear least squares problem solved to find the adjustments, $\Delta d$ and $\Delta p_{eop}$, for these parameters. The least squares solution is then iterated by re-linearizing the problem around the adjusted values of the solved-for parameters, and so on, until the solution converges. The linear least squares problem is now:

$$r_j(d,p_{eop})+\nabla_d r_j(d,p_{eop})\Delta d \text{ approximates } T(p_{eop})r_{ej}+ \nabla_{eop}T(p_{eop})r_{ej}\Delta p_{eop}$$

Isolating the unknowns on the left hand side results with the classical formulation of least squares problems:

$$\nabla_d r_j(d,p_{eop})\Delta d - \nabla_{eop}T(p_{eop})r_{ej}\Delta p_{eop} \text{ approximates } T(p_{eop})r_{ej}-r_j(d,p_{eop}); j=1,\ldots N$$

with the associated data noise $s_j$. This numerical least squares problem can be solved using a square root information filter (SRIF) factorization approach. Possible approaches can include a method for Housholder orthonormal triangulation, a method for inverting an upper triangular matrix, and a method to combining SRIF arrays using Householder orthogonal transformations [See, for example, from Bierman, Factorization Methods for Discrete Sequential Estimation, Dover, 2006, incorporated herein by reference]. These algorithms can be stored into the non-volatile memory.

As shown in step (S8) of FIG. 3, steps S5 through S7 are repeated until a) the satellite orbits of the last iteration are sufficiently close to the broadcast ephemeris for that satellite or b) the value of the estimated parameters x, x', $p_d$ and $p_{eop}$ does not change appreciably from the previous iteration. In other words, if the solved-for 'delta' values are below a certain predetermined threshold, that is, too small to matter, or if the distance between the model and the observations is less than a certain predetermined threshold, the least squares problem is deemed to have converged, and the iteration process is stopped. If these conditions are not met, and if the number of iterations does not exceed a certain predetermined threshold, the least squares problem is iterated with the new nominal parameter values: $d=d+\Delta d$, and $p_{eop}=p_{eop}+\Delta p_{eop}$.

According to one embodiment of the present disclosure, this least squares parameter estimation problem is solved for one satellite in each orbital plane, resulting in six satellites in the case of GPS (which has six orbital planes). Other embodiments may solve the problem for a different selection of satellites, trading CPU time and solution accuracy. It is expected that the least squares estimation problem will yield a vastly different set of dynamic parameters, $p_d$, for each satellite. However, the estimated values of the EOP parameters, may also be different. To improve the accuracy of the estimated value of EOP parameters, $p_{eop}$, the estimated value, together with the full covariance matrix from each satellite can be combined using the SRIF factorization approach described above, as shown in step (S9) of FIG. 3. This results in a single, robust, estimate of the EOP values.

Once the values of the uncertain EOPs, $p_{eop}$, have been robustly estimated, the least squares problem for all satellites can be formed and solved, now estimating only the initial condition parameters x, x' and the dynamic parameters $p_d$, and holding the EOPs fixed to their final, combined, estimated values. This is also shown in step (S10) of FIG. 3. The result of this process will be a set of initial conditions (x, x') and dynamic parameters, $p_d$, for all satellites. These ingredients will allow propagation of the orbits of these satellites into the future (with the model explained above), as also shown in steps (S11) through (S13) of FIG. 3. These values will be stored in the non-volatile memory (104) in the receiver. Such values represent the predicted orbits that can be used to assist in signal acquisition and positioning.

Figure 4:
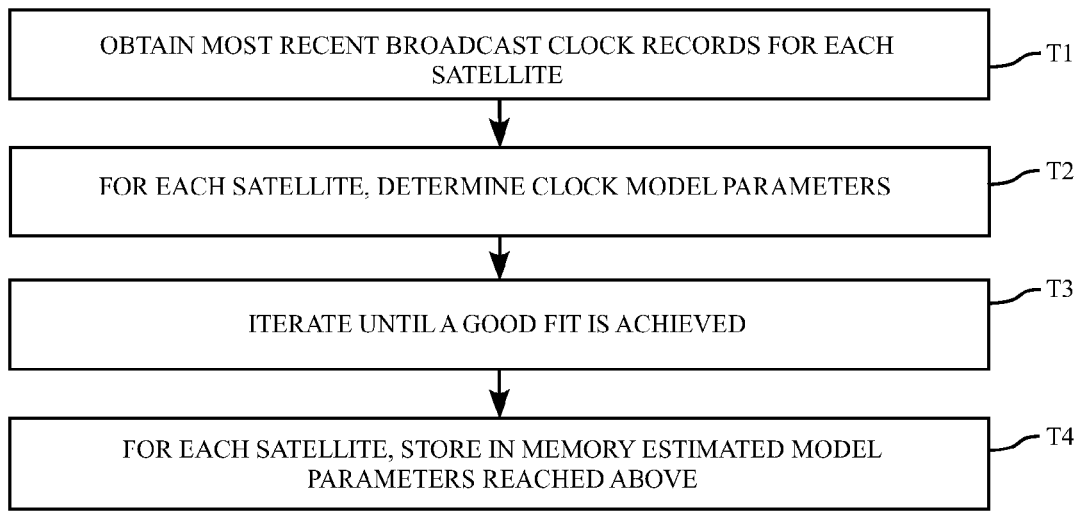
FIG. 4 shows a flow chart of the clock propagation process according to the present disclosure.

Reference will now be made to FIG. 4, which shows a flowchart of a method to predict satellite clock states in accordance with an embodiment of the present disclosure.

As shown in step (T1), the most recent broadcast clock records for each satellite are loaded from memory. In a favored embodiment these records span at least one day. In step (T2), for each satellite, clock model parameters are determined by fitting the clock model to the broadcast ephemeris value.

The nominal model of the GNSS clock is quadratic in time plus a once-per revolution harmonic, resulting in 5 model parameters per satellite (3 for the quadratic polynomial and 2 for the sine and cosine components of the once-per-revolution harmonic). These model parameters can be estimated using a least squares fit of the model to several days of observed clock values extracted from the broadcast ephemeris. See iteration step (T3) of FIG. 4. Once the model parameters have been estimated individually for each satellite, the model for each satellite can be propagated forward indefinitely to produce the predicted clock values, as shown in step (T4) of FIG. 4. The estimated model parameters for each satellite are stored in the memory (204) of the receiver (210). They can be invoked to generate clock predictions at any time. According to one embodiment of the present disclosure, 4 days of broadcast clock values can be used in the least squares fit to the model. Since clock jumps inconsistent with the model can be occasionally introduced by the GNSS operators, the least squares fit error (root mean square—RMS) can be checked against a predetermined threshold, nominally 1 meter. If the RMS fit exceeds the threshold, the most latent 12 hour segment of the fit interval can be removed in attempt to produce an interval without model inconsistencies. This process can be repeated until the fit RMS is below the threshold, or if the fit interval is less than 12 hours. For fit intervals less than 2 days a linear clock model should be applied (2 parameters per satellite). As usual, such algorithmic model can be stored into section (203) of the receiver (210).

At the end of the prediction process, the propagated orbit and the predicted clock model are available to assist the receiver in the acquisition of future GNSS signals. This prediction process can be repeated whenever new ephemeris data records become available, subject to receiver power management considerations and other operational trades.

As described above, and as also mentioned with reference to FIG. 2, according to one of the embodiments of the present disclosure, the receiver according to the present disclosure will comprise a non-volatile memory section (204) containing:

1) the object code for the various software routines discussed above, such as: i) the EOP predictive model; ii) the methods for producing the rotation matrix; iii) the GNSS orbit model integrating the equations of motion: iv) the SRIF algorithms; v) the method for iterative estimate of the orbital initial conditions, dynamic parameters and EOPs; vi) the method for clock prediction; and vii) the method for optimal sampling of GNSS broadcast ephemeris data.
2) the most recently recorded broadcast ephemerides.
3) a database of orbital dynamic parameters d for initialization purposes.
4) a priori EOP values generated through the EOP predictive model above.
5) predicted orbit and clock states obtained as a result of applying the methods described in 1) above.

Accordingly, what has been shown are methods and apparatus for autonomous, in-receiver prediction of GNSS ephemerides. While the methods and apparatus have been described by means of specific embodiments and applications thereof, it is understood that numerous modifications and variations could be made thereto by those skilled in the art without departing from the spirit and scope of the disclosure. It is therefore to be understood that within the scope of the claims, the disclosure may be practiced otherwise than as specifically described herein.

The invention claimed is:

1. A method for predicting satellite orbit information, comprising:
   i) obtaining a broadcast orbital ephemeris of the satellite;
   ii) generating initial earth orientation parameters (EOP) from historical observation records based on an earth orientation model;
   iii) generating initial orbital dynamic parameters and an initial set of satellite initial conditions;
   iv) iteratively estimating earth orientation parameters (EOP), orbital dynamic parameters, and satellite initial conditions, using a satellite dynamics model, the broadcast orbital ephemeris, the initial earth orientation parameters (EOP), the initial orbital dynamic parameters, and the initial set of satellite initial conditions until convergence is obtained;
   v) obtaining predicted orbits by propagating forward in time, through the satellite dynamics model, the estimated earth orientation parameters (EOP), the estimated orbital dynamic parameters, and the estimated satellite initial conditions;
   vi) converting the predicted orbits to earth-centered-earth-fixed (ECEF) coordinates using the estimated earth orientation parameters (EOP); and
   vii) storing the converted predicted orbits.

2. The method of claim 1, wherein orbit information of a plurality of satellites is autonomously predicted by applying steps i) through vii) to the plurality of satellites.

3. The method of claim 2, wherein the plurality of satellites and the receiver are part of a Global Navigation Satellite System (GNSS).

4. The method of claim 1, wherein EOP values and their covariance matrix estimated from one satellite data, are optimally combined with estimates of EOP and covariance from other satellites data.

5. The method of claim 4, wherein the earth orientation model is based on a parametric fit to historic time series of measured EOP values.

6. The method of claim 1, wherein the EOP comprise X polar motion, Y polar motion, and length of day (LOD).

7. The method of claim 1, further comprising converting the obtained broadcast orbital ephemeris of the satellite from a first coordinate system to a second coordinate system.

8. The method of claim 7, further comprising, during the iterative estimation, calculating sensitivities of the converted broadcast orbital ephemeris to EOP.

9. The method of claim 7, wherein the first coordinate system is an earth-centered-earth-fixed (ECEF) Cartesian coordinate system and the second coordinate system is an earth-centered-inertial (ECI) coordinate system.

10. The method of claim 1, wherein the satellite and the receiver are part of a Global Navigation Satellite System (GNSS).

11. The method of claim 1, wherein the broadcast ephemeris of the satellite is obtained through a sampling process.

12. The method of claim 11, wherein the sampling process occurs at least three times a day.

13. The method of claim 11, wherein the sampling process occurs with a daily periodicity-avoiding sampling frequency.

14. The method of claim 13, wherein the sampling frequency is selected from the group consisting of a 7-hour interval sampling frequency, and a 10-hour interval sampling frequency.

15. The method of claim 1, wherein step ii) is performed through a least squares fit to satellite states.

16. The method of claim 15, wherein the satellite states are earth-centered-earth-fixed (ECEF) satellite states.

17. The method of claim 16, wherein the least squares fit is solved through a square root information filter (SRIF) factorization approach.

18. The method of claim 1, wherein convergence of step ii) is obtained a) when currently estimated orbital position, velocity, and orbital dynamic parameters are sufficiently close to the broadcast ephemeris for that satellite or b) when the currently estimated orbital position, velocity condition and orbital dynamic parameters are sufficiently close to their preceding values.

19. The method of claim 1, wherein the predicted orbits are stored in the satellite receiver.

20. A method to autonomously predict satellite clock states, comprising:
   i) obtaining broadcast clock records for the satellite;
   ii) estimating future clock states of the satellite based on a prediction model of the clock state as a function of time,
   iii) storing model parameters; and
   iv) invoking the clock state model, as embodied in the stored model parameter, at any future time for autonomous prediction of the satellite clock states,
   wherein the prediction model is quadratic in time plus a once-per orbit revolution harmonic, resulting in five model parameters per satellite.

21. The method of claim 20, wherein clock states of a plurality of satellites are autonomously predicted by applying steps i), ii), iii) and iv) to the plurality of satellites.

22. A method for autonomous prediction of satellite orbit information and satellite clock states, comprising:
   autonomously predicting satellite orbit information according to the method of claim 1; and
   autonomously predicting satellite clock states according to the method comprising:
   i) obtaining broadcast clock records for the satellite;
   ii) estimating future clock states of the satellite based on a prediction model of the clock state as a function of time,
   iii) storing model parameters; and
   iv) invoking the clock state model, as embodied in the stored model parameter, at any future time for autonomous prediction of the satellite clock states,
   wherein the prediction model is quadratic in time plus a once-per orbit revolution harmonic, resulting in five model parameters per satellite.

23. A Global Navigation Satellite System (GNSS) receiver comprising:
   a processing unit; and
   a memory unit,
   wherein the memory unit is configured to comprise:
   a first memory section storing software code for satellite orbit prediction and satellite clock states prediction;
   a second memory section storing recorded satellite broadcast orbit and satellite clock states;
   a third memory section storing earth orientation parameter (EOP) values and orbital dynamic parameters; and
   a fourth memory section storing predicted satellite orbits and satellite clock states calculated in accordance with the software code stored in the first memory section;
   wherein the software code for satellite orbit prediction comprises steps for iteratively estimating earth orientation parameters (EOP).

24. The GNSS receiver of claim 23, wherein the software code for satellite orbit prediction operates according to the method comprising:
   i) obtaining a broadcast orbital ephemeris of the satellite;
   ii) generating initial earth orientation parameters (EOP) from historical observation records based on an earth orientation model;
   iii) generating initial orbital dynamic parameters and an initial set of satellite initial conditions;
   iv) iteratively estimating earth orientation parameters (EOP), orbital dynamic parameters, and satellite initial conditions, using a satellite dynamics model, the broadcast orbital ephemeris, the initial earth orientation parameters (EOP), the initial orbital dynamic parameters, and the initial set of satellite initial conditions until convergence is obtained;
   v) obtaining predicted orbits by propagating forward in time, through the satellite dynamics model, the estimated earth orientation parameters (EOP), the estimated orbital dynamic parameters, and the estimated satellite initial conditions;
   vi) converting the predicted orbits to earth-centered-earth-fixed (ECEF) coordinates using the estimated earth orientation parameters (EOP); and
   vii) storing the converted predicted orbits,
   and the software code for satellite clock states prediction operates according to the method comprising:
   i) obtaining broadcast clock records for the satellite;
   ii) estimating future clock states of the satellite based on a prediction model of the clock state as a function of time,
   iii) storing model parameters; and
   iv) invoking the clock state model, as embodied in the stored model parameter, at any future time for autonomous prediction of the satellite clock states,
   wherein the prediction model is quadratic in time plus a once-per orbit revolution harmonic, resulting in five model parameters per satellite.

25. A personal navigation device comprising the GNSS receiver of claim 23.

26. The personal navigation device of claim 25, said device being a cell phone or a car navigation device.

* * * * *